US008929368B2

(12) United States Patent
Zhang

(10) Patent No.: US 8,929,368 B2
(45) Date of Patent: Jan. 6, 2015

(54) CONTROL METHOD OF VIRTUAL LINK DISCOVERY AND SYSTEM FOR FIBRE CHANNEL OVER ETHERNET PROTOCOL

(75) Inventor: Changjun Zhang, Zhejiang (CN)

(73) Assignee: Hangzhou H3C Technologies Co., Ltd., Zhejiang (CN)

(*) Notice: Subject to any disclaimer, the term of this patent is extended or adjusted under 35 U.S.C. 154(b) by 351 days.

(21) Appl. No.: 13/387,067

(22) PCT Filed: Oct. 18, 2010

(86) PCT No.: PCT/CN2010/077826
§ 371 (c)(1),
(2), (4) Date: Mar. 30, 2012

(87) PCT Pub. No.: WO2011/047612
PCT Pub. Date: Apr. 28, 2011

(65) Prior Publication Data
US 2012/0195188 A1    Aug. 2, 2012

(30) Foreign Application Priority Data
Oct. 19, 2009    (CN) .......................... 2009 1 0236061

(51) Int. Cl.
*H04L 12/28*    (2006.01)
*H04L 12/46*    (2006.01)
(52) U.S. Cl.
CPC ................................ *H04L 12/4641* (2013.01)
USPC ............ 370/389; 370/401; 709/228; 709/242
(58) Field of Classification Search
None
See application file for complete search history.

(56) References Cited

U.S. PATENT DOCUMENTS

| 2008/0313724 | A1  | 12/2008 | Doddapaneni et al. |
| 2009/0252181 | A1  | 10/2009 | Desanti |
| 2009/0254677 | A1* | 10/2009 | Desanti ......................... 709/242 |
| 2009/0292813 | A1* | 11/2009 | Snively et al. ................ 709/228 |

FOREIGN PATENT DOCUMENTS

CN    101044717 A    9/2007

OTHER PUBLICATIONS

Desanti, Claudio, FCoE Modeling, T11/07-458v0, Cisco, Aug. 2007.
International Search Report for PCT Application No. PCT/CN2010/077826, Chinese Intellectual Property Office, Jan. 27, 2011.
Extended European Search Report dated Dec. 5, 2013 issued on EP Patent Application No. 10824453.4, European Patent Office.
Jon Tate: "An Introduction to Fibre Channel over Ethernet, and Fibre Channel over Convergence Enhanced Ethernet", Internet Citation, Mar. 18, 2009, pp. 1-18, http://www.redbooks.ibm.com/redpapers/pdfs/redp4493.pdf.
Steven Wilson et al: "Fibre Channel Backbone—5 (FC-BB-5) Rev 2.00", Jun. 4, 2009, pp. 1-165, retrieved from the internet: http:.t11.org/ftp/t11/pub/fc/bb-5/09-056v5.pdf.

* cited by examiner

*Primary Examiner* — Awet Haile

(57) ABSTRACT

A control method of virtual link discovery and a system for Fiber Channel over Ethernet (FCoE) protocol allocates some Ethernet Nodes (ENodes) and FCoE Forwarders (FCFs) to different virtual networks during networking, and provides a Virtual Node (VN) port of each ENode and a Virtual Fiber Channel (VFC) port of each FCF with a Virtual Network Identification (VN ID) of a virtual network to which they belong. In this way, a VN port of an ENode may establish a virtual link with a VFC port that belongs to the same virtual network in preference, so that some ENodes are made to access FCFs that belong to the same virtual networks as the ENodes.

13 Claims, 4 Drawing Sheets

CONTROL METHOD OF VIRTUAL LINK DISCOVERY AND SYSTEM FOR FIBRE CHANNEL OVER ETHERNET PROTOCOL

CLAIM FOR PRIORITY

The present application is a national stage filing under 35 U.S.C. 371 of PCT application number PCT/CN2010/077826, having an international filing date of Oct. 18, 2010, which claims priority to Chinese Patent Application No. 200910236061.7, filed on Oct. 19, 2009, the disclosures of which are hereby incorporated by reference in their entireties.

BACKGROUND

An FCoE technique is a technique that operates a Fibre Channel (FC) protocol family based on Ethernet. In an FCoE system, an Ethernet node (ENode) such as a server, a storage device and the like, is connected to an Ethernet interface of an FCoE Forwarder (FCF), which in turn is connected to an FC network via an FC interface of the FCF.

Specifically, referring to FIG. 1, between each ENode and an FCF connected thereto, there is not only a physical link between Ethernet interfaces in an Ethernet layer, but also a virtual logic link between a Virtual Node (VN) port and a Virtual Fibre Channel (VFC) port in an FC layer, which is called a virtual link for short, namely, a logic connection formed by the VN port→the Ethernet interface of the ENode→the Ethernet interface of the FCF→the VFC port.

Referring to FIG. 2, a process of virtual link discovery between an ENode and an FCF may be realized through FCoE Initialization Protocol (FIP) messages, which specifically comprises the following operations.

Block 201: the ENode sends, via its VN port, an FIP Discovery Solicitation message to a VFC port of an FCF that has the highest priority or whose forwarder name has the largest value among all of the FCFs.

Block 202: the FCF checks an address mode of the ENode.

Block 203: the FCF returns, via its VFC port, an FIP Discovery Advertisement message to the VN port of the ENode after the address mode check of the ENode is passed.

Block 204: the ENode checks a maximum size (MAX size) of the Discovery Advertisement message and obtains a physical (MAC) address of the FCF.

Block 205: the ENode sends, via its VN port, a Virtual Link Instantiation Request message carrying a Fabric Login (FLOGI) message to the VFC port of the FCF after the MAX size check is passed.

Block 206: the FCF activates the VFC port according to the FLOGI message carried in the Virtual Link Instantiation Request message.

Block 207: the FCF determines whether a login of the VN port of the ENode is allowed, and replies a Virtual Link Instantiation Reply message carrying a login response (LS_ACC) message to the VN port of the ENode if the login of the VN port of the ENode is allowed.

Block 208: the ENode activates the VN port that has logged into the VFC port of the FCF according to the LS_ACC message carried in the Virtual Link Instantiation Reply message, so that a virtual link between this VN port and the VFC port of the FCF is established.

So far, the process of virtual link discovery ends.

Thus, in addition to having such advantages as I/O integration and network uniformity, the FCoE system based on virtual links can change an FC network topology substantively by arbitrarily establishing different virtual links between FCFs and ENodes.

Referring to FIG. 3, suppose that there are two FCFs and four ENodes, virtual links (as shown by solid lines in FIG. 3) are established between each of ENodes 1-4 and FCF1 according to the process shown in FIG. 2, and ENodes 1-4 access an FC network through the virtual links to FCF1. When a fault occurs in FCF1, ENodes 1-4 may switch to FCF2 serving as a backup and establish virtual links to FCF2 (as shown by dashed lines in FIG. 3), and may access the FC network again through the virtual links to FCF2, so that link backup for the FC network topology is realized and hence network reliability is improved.

However, in the existing networking ways by which the link backup for the FC network topology is realized, all the ENodes will access the same FCF that has the highest priority or whose forwarder name has the largest value upon discovery of a virtual link according to the process shown in FIG. 2. That is, in block 201, all the ENodes may only send the Discovery Solicitation messages to the same specified FCF that has the highest priority or whose forwarder name has the largest value according to such predefined information as the priority of the FCF or the forwarder name. As a result, all the ENodes access the same FCF, such as FCF1 in FIG. 3, while other FCFs serving as backups, such as FCF2 in FIG. 3, may remain in an idle state for a long time.

In this case, the FCF that all the ENodes access may have message congestion, while the resources of the FCFs serving as backups are. Furthermore, during the switching to the backup, each of the ENodes has to perform the process of virtual link discovery as shown in FIG. 2, so that an efficiency of switching the virtual links is low.

SUMMARY

In view of the above, the present disclosure discloses a control method of virtual link discovery in an FCoE system as well as an FCoE system, which may reduce message congestion and increase resource utilization rate.

A control method of virtual link discovery in an FCoE system disclosed in the present disclosure is applied between Ethernet Nodes (ENodes) and FCoE Forwarders (FCFs), wherein some of the ENodes and the FCFs are allocated to different virtual networks, a Virtual Node VN port of each ENode and a Virtual Fibre Channel VFC port of each FCF are provided respectively with a Virtual Network Identification (VN ID) of a virtual network to which they belong, and the control method comprises the following operations:

a1: an ENode sending, via its VN port, an FCoE Initialization Protocol FIP Discovery Solicitation message to the VFC port of each FCF, the FIP Discovery Solicitation message carrying the VN ID of the VN port;

a2: the ENode receiving, via its VN port, an FIP Discovery Advertisement message replied by the VFC port of each. FCF, the FIP Discovery Advertisement message carrying the VN ID of the VFC port;

a3: the ENode matching the VN ID of its VN port with the VN ID carried in each of the FIP Discovery Advertisement messages, and logging into the VFC port corresponding to the matched VN ID in preference, so that a virtual link is established between the VN port of the ENode and the VFC port.

Block a2 further comprises adding, by the ENode, all of the FCFs that reply the FIP Discovery Advertisement message, to an accessible FCF list the ENode has maintained.

After block a3, there is a further operation of re-initiating, by the ENode, a login of the VN port to a VFC port of any FCF in the accessible FCF list the ENode has maintained when a fault occurs in an FCF where a VFC port connected to the VN port of the ENode is located.

Block a1 further comprises triggering a timer corresponding to the VN port, which represents a collection time.

The method further comprises, when timing of the timer expires, ending block a2 and performing block a3.

All types of FIP messages, including the FIP Discovery Solicitation message and the FIP Discovery Advertisement message, carry the VN ID in a reserved field of their message header.

Block a3 further comprises, when there is no matched VN ID, initiating a login to a VFC port whose default value indicates that the reserved field does not carry anything.

A further control method of virtual link discovery in an FCoE system disclosed in the present disclosure is applied between Ethernet Nodes (ENodes) and FCoE Forwarders (FCFs), wherein some of the ENodes and the FCFs are allocated to different virtual networks, a Virtual Node VN port of each ENode and a Virtual Fibre Channel VFC port of each FCF are provided respectively with a Virtual Network Identification VN ID of a virtual network to which they belong, and the control method comprises the following operations:

b1: an FCF receiving, via its VFC port, an FCoE initialization Protocol FIP Discovery Solicitation message sent by the VN port of each ENode, the FIP Discovery Solicitation message carrying the VN ID of the VN port;

b2: the FCF replying, via its VFC port, an FIP Discovery Advertisement message to the VN port of each ENode, the FIP Discovery Advertisement message carrying the VN ID of the VFC port so that an ENode belonging to the same virtual network as the FCF logs into the VFC port of the FCF in preference and a virtual link is established between a VN port of the ENode and the VFC port.

All types of FIP messages, including the FIP Discovery Solicitation message and the FIP Discovery Advertisement message, carry the VN ID in a reserved field of their message header.

An FCoE system disclosed in the present disclosure comprises Ethernet Nodes (ENodes) having Virtual Node (VN) ports and FCoE Forwarders (FCFs) having Virtual Fibre Channel VFC ports, some of the ENodes and the FCFs being allocated to different virtual networks, a VN port and a VFC port of each ENode and each FCF belonging to each virtual network are provided respectively with a Virtual Network Identification VN ID of the virtual network;

each ENode sending an FCoE Initialization Protocol FIP Discovery Solicitation message to the VFC port of each FCF and receiving an FIP Discovery Advertisement message replied by the VFC port of each FCF via its VN port, the FIP Discovery Solicitation message carrying the VN ID of the VN port, the FIP Discovery Advertisement message carrying the VN ID of the corresponding VFC port; matching the VN ID of its VN port with the VN ID carried in each of the FIP Discovery Advertisement messages, and logging into the VFC port corresponding to the matched VN ID in preference, so that a virtual link is established between the VN port of the ENode and the VFC port;

each FCF receiving the FIP Discovery Solicitation message sent by the VN port of each ENode and replying the FIP Discovery Advertisement message to the VN port of each ENode via its VFC port, the FIP Discovery Advertisement message carrying the VN ID of the VFC port.

Each ENode is further used for adding all of the FCFs that reply the FIP Discovery Advertisement message to an accessible FCF list the ENode has maintained, so that a login can be initiated to a VFC port of any FCF in the accessible FCF list when a fault occurs in an FCF where a VFC port connected to the VN port of the ENode is located.

Each ENode is further used for triggering a timer corresponding to its VN port that represents a collection time when sending the Discovery Solicitation message via its VN port, and starting to perform the matching when timing of the timer expires.

All types of FIP messages including the FIP Discovery Solicitation message and the FIP Discovery Advertisement message carry the VN ID in a reserved field of their message header.

Each ENode is further used for initiating a login to a VFC port whose VN ID value is a default value indicating that the reserved field does not carry anything when there is no matched VN ID.

It can be seen from the above that the present disclosure allocates some of the ENodes and the FCFs to different virtual networks during networking, so that VN ports and VFC ports of some of the ENodes and the FCFs belong to different virtual networks and have VN IDs of the virtual networks to which they belong. In this way, the VN ports of the ENodes exchange the VN IDs with the VFC ports of FCFs, so that the VN port of each ENode may establish a virtual link with a VFC port belonging to the same VN in preference. In this case, some ENodes access FCFs that belong to the same virtual network as the ENodes, thereby avoiding accessing the same FCF at the same time by all the ENodes. Hence, a possibility of message congestion in FCF is reduced, and a possibility of resource waste due to long idling time of one or more FCFs is also reduced.

As a further alternative, the ENode may add all of the FCFs replying the FIP Discovery Advertisement message to the accessible FCF list the ENode has maintained. Thus, when a fault occurs in an FCF where a VFC port connected to the VN port of the ENode is located, in order to switch to other FCFs to realize backup, the ENode may directly initiate a VN port login to a VFC port of any FCF in the accessible FCF list it has maintained, thereby avoiding a repetitive exchange of the Discovery Solicitation message and the Discovery Advertisement message with other FCFs serving as backups and hence increasing an efficiency of the switching to the backup.

In addition, examples of the present disclosure may carry the VN ID using the reserved field in the message headers of all FIP messages in an FIP protocol family. Moreover, for an ENode and an FCF that do not support a virtual network, values of VN IDs of a VN port and a VFC port of the ENode and the FCF may take a default value of 0, indicating that the reserved fields do not carry anything, thereby improving compatibility of the present disclosure.

DETAILED DESCRIPTION

The present disclosure is described in further detail below with reference to the accompanying drawings and in conjunction with examples so as to make objects and technical solutions thereof clearer.

In an example of the present disclosure, some ENodes and FCFs are allocated to different virtual networks during networking, so that some VN ports belong to virtual networks of the ENodes where they are located and have virtual network IDs (VN IDs) of the virtual networks, and some VFC ports belong to virtual networks of the FCFs where they are located and have VN IDs of the virtual networks. Moreover, a VN port of an ENode may exchange VN IDs with VFC ports of a plurality of FCFs and can preferentially establish virtual links with VFC ports that belong to the same virtual network.

In this case, for the VN port and the VFC port belonging to the same virtual network, their respective ENode and FCF must belong to the same virtual network. Hence, ENodes in each virtual network can be made to access FCFs in the same virtual network so as to avoid accessing the same FCF at the same time by all the ENodes, which reduces a possibility of message congestion in the FCF. in addition, since FCFs in each virtual network may be accessed by ENodes of the virtual network, a possibility of resource waste caused by long time idling of one or more FCFs can be reduced.

Figure 4:
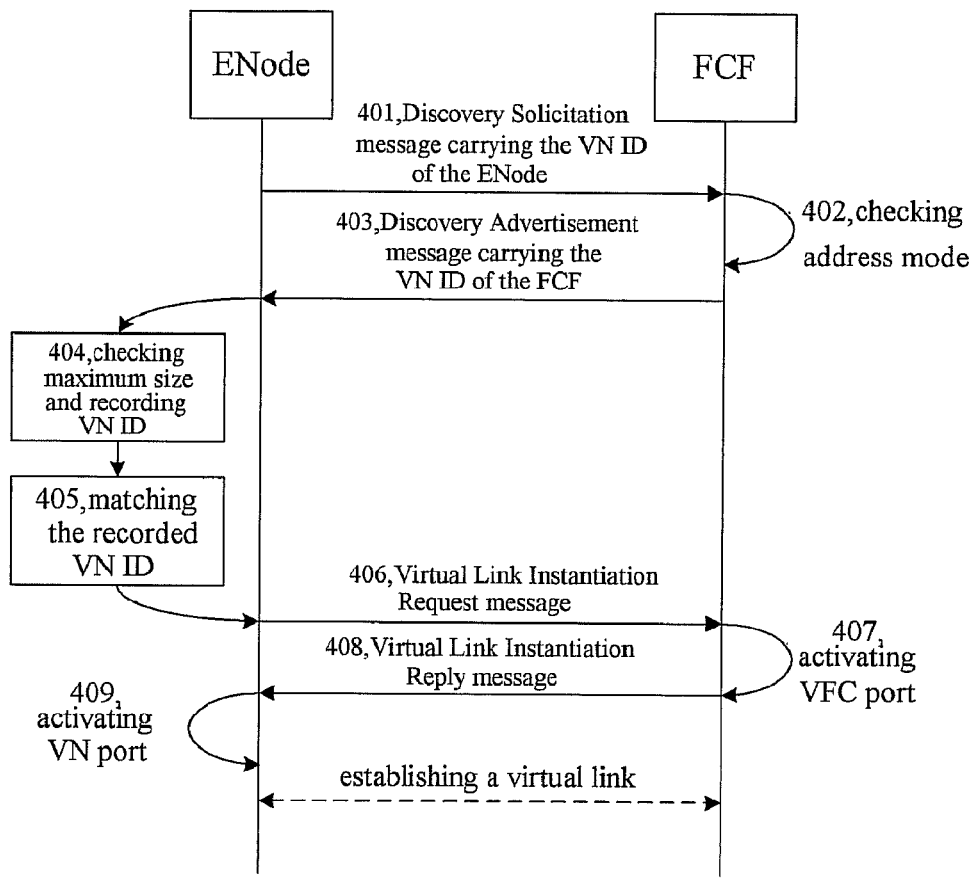
FIG. 4 is a schematic diagram of a process of virtual link discovery in an FCoE system according to an example of the present disclosure.

FIG. 4 is a schematic diagram of a process of virtual link discovery in an FCoE system according to an example of the present disclosure. As shown in FIG. 4, a process of interacting, by an ENode, with each FCF it may access is as follows.

Block 401: the ENode sends, via its VN port, an FIP Discovery Solicitation message to a VFC port of each FCF (only one FCF is shown in FIG. 4), and carries a VN ID of the VN port in the FIP Discovery Solicitation message.

That is to say, in addition to the FCF shown in FIG. 4, the ENode in block 401 may send the FIP Discovery Solicitation message to other FCFs through its VN port. This is different from sending the FIP Discovery Solicitation message only to a VFC port of an FCF that has the highest priority or whose forwarder name has the largest value in the prior art. Thus, this operation may be viewed as a process of detecting its accessible FCFs by the ENode.

Block 402: the FCF checks an address mode of the ENode.

In a practical application, in addition to the ENode shown in FIG. 4, the FCF may receive FIP Discovery Solicitation messages sent by other ENodes and check address modes of the other ENodes.

Block 403: the FCF replies, via its VFC port, an FIP Discovery Advertisement message to the VN port of the ENode after the address mode check of the ENode is passed, and carries a VN ID of the VFC port in the FIP Discovery Advertisement message.

Block 404: the ENode checks a MAX size of the FIP Discovery Advertisement message replied by a VFC port of each FCF (only one FCF is shown in FIG. 4) and obtains a MAC address of the FCF, and then records the VN ID carried in the FIP Discovery Advertisement message.

That is to say, in addition to receiving the FIP Discovery Advertisement message replied by the VFC port of the FCF shown in FIG. 4, the VN port of the ENode in this operation will receive FIP Discovery Advertisement messages replied by VFC ports of other FCFs at the same time. Thus, this operation may be viewed as a process of collecting the accessible FCFs by the ENode.

In addition, in this operation, the ENode may further add the collected accessible FCFs, i.e. FCFs where VFC ports corresponding to VN IDs carried in the FIP Discovery Advertisement messages are located, to an accessible FCF list the ENode has maintained, so that when a fault occurs in a subsequently connected FCF, any FCF in the accessible FCF list may be used as a backup and a switching to the backup can be realized through initiating a login to a VFC port of the backup FCF. In this case, during the switching to the backup, the processing of block 401 to this block 404 may be skipped to directly initiate a login of the VN port according to the subsequent operations, thereby increasing an efficiency of the switching to the backup.

In a practical application, a timer may be provided for each VN port, which represents a collection time. When sending the Discovery Solicitation message through the VN port in block 401, the ENode further triggers a timer corresponding to the VN port. The collection performed in this block 404 is ended when timing of the timer expires, and moves to the subsequent step 405.

Block 405: the ENode matches the VN ID of its VN port with the VN ID carried in each of the FIP Discovery Advertisement messages the ENode has recorded, and, when there is a matched VN ID, confirms that the VN port belongs to the same VN as a VFC port corresponding to the VN ID, and then performs block 406.

Block 406: the ENode sends, via its VN port, an FIP Virtual Link Instantiation Request message carrying an FLOGI message to the VFC port corresponding to the matched VN ID so as to log into the VFC port of the matched VN ID.

Block 407: the FCF activates the VFC port according to the FLOGI message carried in the FIP Virtual Link Instantiation Request message.

Block 408: the FCF determines whether the VN port of the ENode is allowed to log in, and replies an FIP Virtual Link Instantiation Reply message carrying an LS_ACC message to the VN port of the ENode if the VN port of the ENode is allowed to log in.

Block 409: the ENode activates the VN port that has logged into the VFC port so that a virtual link is established between the VN port and the VFC port.

It should be noted again that the processing in blocks 406-408 of FIG. 4 concerns only the FCF where one VFC port matching the VN ID is located, while the processing in blocks 401-403 of FIG. 4 concerns all the accessible FCFs.

So far, the process of virtual link discovery ends.

In the control method of virtual link discovery in this example, in order to facilitate carrying of the VN ID in the FIP Discovery Solicitation message and the FIP Discovery Advertisement message, preferably, the VN ID is carried in a reserved field in a message header of an FIP protocol family. In this case, after discovery and establishment of a virtual link between the ENode and the FCF, message headers of an FIP Non-Discovery Advertisement message, an FIP Keep Alive (FKA) message, and other various types of FIP messages used during interaction will also carry the VN ID. That is to say, all types of FIP messages in the FIP protocol family will carry the VN ID.

In addition, when allocating the ENodes and the FCFs to different virtual networks, there may be some ENodes and FCFs that do not support a virtual network. Values of VN IDs of VN ports and VFC ports of the ENodes and the FCFs that do not support the virtual network may be set to a default value of 0 indicating that the above-mentioned reserved field does not carry anything. Of course, values of VN IDs of VN ports and VFC ports of ENodes and FCFs that support the virtual network may be a default value of 0 before a they are set.

Thus, if no matched VN ID is found in block 405, it means that there is no VFC port that belongs to the same virtual network as the VN port. This may be because a fault occurs in the FCF in the same virtual network or because the ENode where the VN port is located does not support the virtual network, or because neither the ENode where the VN port is located nor the FCF in the same virtual network is set. In any regard, the VN port may initiate a login to any VFC port whose VN ID has a default value of 0, so that ENodes and FCFs under all circumstances are compatible.

That is to say, when there are ENodes and FCFs under all circumstances that are to be compatible, the VN ID of the VFC port connected to the VN port via a virtual link may be different from the VN ID previously collected by the VN port.

The above is the detailed description of the control method of virtual link discovery in this example. Now an FCoE system that may realize virtual link discovery in this example will be described in detail.

The FCoE system of this example comprises ENodes having VN ports and FCFs having VFC ports, wherein some of the ENodes and the FCFs are allocated to different virtual networks. Accordingly, a VN port of an ENode belonging to each virtual network has a VN ID of the virtual network, and a VFC port of an FCF belonging to each virtual network has a VN ID of the virtual network.

Each ENode is used for sending, via its VN port, an FIP Discovery Solicitation message to a VFC port of each FCF, instead of sending the FIP Discovery Solicitation message only to an FCF that has the highest priority or whose forwarder name has the largest value. Moreover, in this example, the FIP Discovery Solicitation message sent by the ENode via its VN port also carries the VN ID of the VN port.

Each FCF is used for replying, via its VFC port, an FIP Discovery Advertisement message to the VN port of the ENode after the address mode check of the ENode is passed, and the replied FIP Discovery Advertisement message carries the VN ID of the VFC port.

in addition, each ENode is also used for checking a MAX size of the FIP Discovery Advertisement message replied by the VFC port of each FCF, obtaining a MAC address of the FCF, and then recording the VN ID carried in the FIP Discovery Advertisement message to realize collection of the accessible FCFs, and then matching the VN ID of its VN port with the VN ID carried in each of the recorded FIP Discovery Advertisement messages, and logging into the VFC port corresponding to the matched VN ID in preference by using an FIP Virtual Link Instantiation Request message carrying an FLOGI message, so that a virtual link is established between the VN port of the ENode and the VFC port after the VN port of the ENode receives an FIP Virtual Link Instantiation Reply message carrying an LS_ACC message replied by the VFC port of the FCF after allowing a login of the VN port.

To increase efficiency of the switching to the backup, each ENode may be further used for adding all of the FCFs that reply the FIP Discovery Advertisement message to an accessible FCF list the ENode has maintained, so that a login may be initiated to a VFC port of any FCF in the accessible FCF list when a fault occurs in an FCF where a VFC port connected to its VN port is located. Moreover, in order to control time of collecting the accessible FCFs, each ENode may be further used for, when sending the Discovery Solicitation message via its VN port, triggering a timer corresponding to the VN port, and starting to perform the matching when timing of the timer expires.

In order to facilitate carrying of the VN ID in the FIP Discovery Solicitation message and the FIP Discovery Advertisement message, preferably, the VN ID is carried in a reserved field in a message header of an FIP protocol family. In this case, after discovery and establishment of a virtual link between the ENode and the FCF, message headers of an FIP Non-Discovery Advertisement message, an FIP Keep Alive (FKA) message, and other various types of FIP messages used during interaction will also carry the VN ID. That is to say, all types of FIP messages in the FIP protocol family will carry the VN ID.

In addition, when allocating the ENodes and the FCFs to different virtual networks, there may be some ENodes and FCFs that do not support a virtual network. Values of VN IDs of VN ports and VFC ports of the ENodes and FCFs that do not support the virtual network may be set to a default value of 0 indicating that the above-mentioned reserved field does not carry anything. Of course, values of VN IDs of VN ports and VFC ports of ENodes and FCFs that support the virtual network may be a default value of 0 before they are set. Thus, if no matched VN ID is found by the ENode, it means that there is no VFC port that belongs to the same virtual network as the VN port. This may be because a fault occurs in the FCF in the same virtual network or because the ENode where the VN port is located does not support the virtual network, or because neither the ENode where the VN port is located nor the FCF in the same virtual network is set. In any regard, the ENode may initiate, through the VN port, a login to any VFC port whose VN ID has a default value of 0, so that ENodes and FCFs under all circumstances are compatible. That is to say, when there are ENodes and FCFs under all circumstances that are to be compatible, the VN ID of the VFC port connected to the VN port of the ENode via a virtual link may be different from the VN ID previously collected for the VN port by the ENode.

Figure 1:
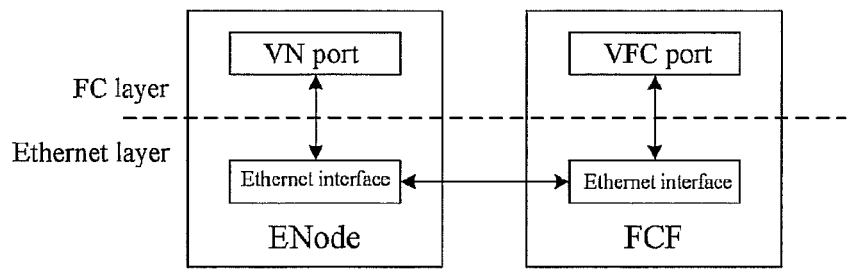
FIG. 1 is a schematic diagram of a virtual link in an existing FCoE system.
Figure 2:
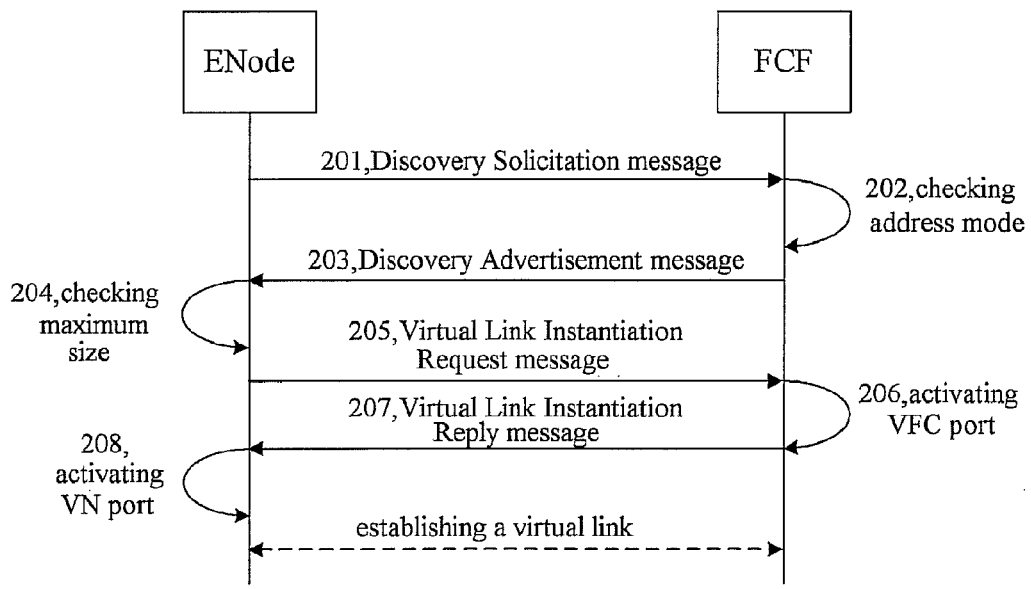
FIG. 2 is a schematic diagram of a process of virtual link discovery in an existing FCoE system.
Figure 3:
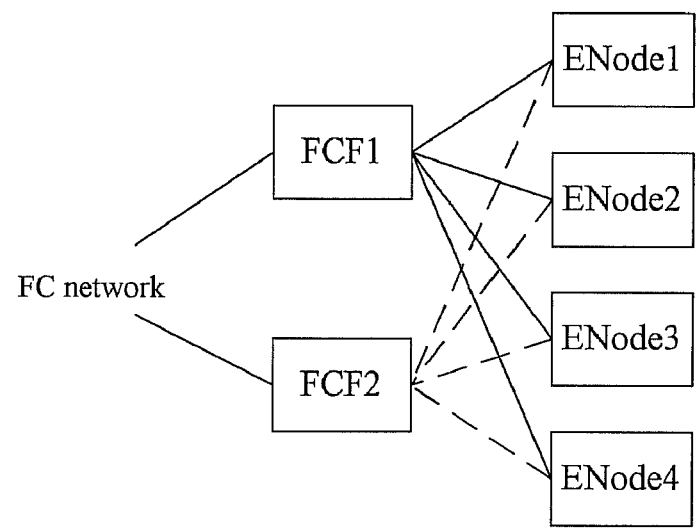
FIG. 3 is a schematic diagram of an example for realizing link backup for an FC network topology in an existing FCoE system.
Figure 5:
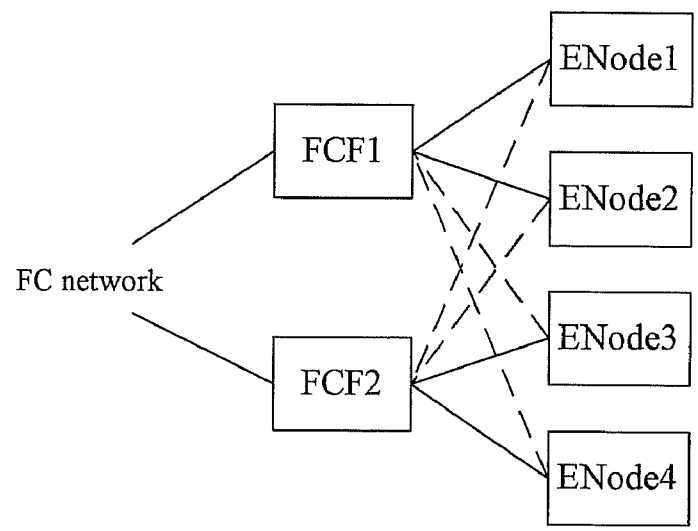
FIG. 5 is a schematic diagram of an example for realizing link backup for an FC network topology in an FCoE system according to an example of the present disclosure.

The technical solution in this example may still realize link backup for the FC network topology by setting different virtual links between FCFs and ENodes. Referring to FIG. 5, suppose again that there are two FCFs and four ENodes, virtual links (as shown by solid lines between ENodes 1-2 and FCF1 in FIG. 5) are established between ENodes 1-2 and FCF1 according to the process shown in FIG. 4, and ENodes 1-2 access an FC network via the virtual links to FCF1; virtual links (as shown by solid lines between ENodes 3-4 and FCF2 in FIG. 5) are established between ENodes 3-4 and FCF2 according to the process shown in FIG. 4, and ENodes 3-4 access the FC network via the virtual links to FCF2. In this way, neither FCF1 nor FCF2 is accessed by all of ENodes 1-4, and neither of them is idle. Compared to the existing mode shown in FIG. 3, this reduces a possibility of message congestion in an FCF and reduces a possibility of resource waste caused by long time idling of one or more FCFs.

When a fault occurs in FCF1, ENodes 1-2 may be directly switched to FCF2 serving as a backup according to the accessible FCF lists they have maintained, and establish virtual links to FCF2 (as shown by dashed lines between ENodes 1-2 and FCF2 in FIG. 5), and access the FC network again through the virtual links to FCF2. When a fault occurs in FCF2, ENodes 3-4 may be directly switched to FCF1 serving as a backup according to the accessible FCF lists they have maintained, and establish virtual links to FCF1 (as shown by dashed lines between ENodes 3-4 and FCF1 in FIG. 5), and access the FC network again through the virtual links to FCF2. Thus, a repetitive exchange of the FIP Discovery Solicitation message and the FIP Discovery Advertisement message as well as such a process as the address mode check may be avoided during the switching, thereby increasing an efficiency of the switching to the backup.

The above are only examples of the present disclosure and are thus not intended to limit a protection scope of the present disclosure. Any modification, equivalent substitution and improvement made within the spirit and principle of the present disclosure shall be included in the protection scope of the present disclosure.

What is claimed is:

1. A control method of virtual link discovery in a Fibre Channel over Ethernet (FCoE) protocol system, the method being applied between Ethernet Nodes (E Nodes) and FCoE Forwarders (FCFs), wherein some of the ENodes and the FCFs are allocated to different virtual networks, the control method comprising:

a1: an ENode sending, via a Virtual Node (VN) port of the ENode, an FCoE Initialization Protocol (FIP) Discovery Solicitation message to Virtual Fiber Channel (VFC) ports of the FCFs, the FIP Discovery Solicitation message carrying a virtual network ID (VN ID) of the VN port indicating which virtual network the VN port belongs to;

a2: the ENode receiving, via the Virtual Node(VN) port, FIP Discovery Advertisement messages replied by the VFC ports of the FCFs, the FIP Discovery Advertisement messages carrying Virtual Network IDs (VN IDs) of the VFC ports indicating which Virtual Networks the VFC ports respectively belong to;

a3: the ENode comparing the Virtual Network (VN ID) of the Virtual Node(VN) port with the VN IDs carried in the FIP Discovery Advertisement messages, and logging the VN node to a VFC port which has the same Virtual Network ID (VN ID) in preference to other VFC ports having different VN IDs, wherein the VN port establishes a virtual link with the VFC port belonging to the same Virtual Network in preference to the other VFC ports belonging to different Virtual Networks.

2. The control method according to claim 1, wherein a2 further comprises adding, by the ENode, all of the FCFs that replied with the FIP Discovery Advertisement message, to an accessible FCF list the ENode maintains;

after a3, re-initiating, by the ENode, a login of the VN port to another VFC port of another FCF in the accessible FCF list it maintains when a fault occurs in the FCF where the VFC port connected to the VN port of the ENode is located.

3. The control method according to claim 2, wherein a1 further comprises triggering a timer corresponding to the VN port, which represents a collection time;

the method further comprises, when timing of the timer expires, ending a2 and performing a3.

4. The control method according to claim 1, wherein each type of FIP messages, including the FIP Discovery Solicitation message and the FIP Discovery Advertisement message, carries its VN ID in a reserved field of its message header.

5. The control method according to claim 4, wherein a3 further comprises, when there is no matched VN ID, initiating a login of the VN node to another VFC port whose default value indicates that a reserved field does not carry anything.

6. A control method of virtual link discovery in a Fibre Channel over Ethernet (FCoE) protocol system, the method being applied between Ethernet Nodes (E Nodes) and FCoE Forwarders (FCFs), wherein some of the ENodes and the FCFs are allocated to different virtual networks, the control method comprising:

b1: an FCF receiving, via a Virtual Fiber Channel (VFC) port of the FCF, FCoE Initialization Protocol (FIP) Discovery Solicitation messages sent by Virtual Node (VN) ports of the ENodes, the FIP Discovery Solicitation messages carrying Virtual Network IDs (VN IDs) of the Virtual Node(VN) ports in respective reserved fields of respective headers of the respective FIP Discovery Solicitation messages;

b2: the FCF replying, via the VFC port, an FIP Discovery Advertisement message to the VN ports of the ENodes, the FIP Discovery Advertisement message carrying a VN ID of the VFC port in a reserved field of a header of the FIP Discovery Advertisement message, wherein an ENode belonging to the same virtual network as the FCF logs a VN port of the ENode to the VFC port of the FCF in preference and a virtual link is established between the VN port of the ENode and the VFC port of the FCF.

7. The control method according to claim 6, wherein each type of FIP messages, including the FIP Discovery Solicitation messages and the FIP Discovery Advertisement message, carries its VN ID in a reserved field of its message header.

8. A Fibre Channel over Ethernet (FCoE) system comprising Ethernet Nodes (E Nodes) having Virtual Node (VN) ports and FCoE Forwarders (FCFs) having Virtual Fibre Channel (VFC) ports, wherein each ENode is to send an FCoE Initialization Protocol (FIP) Discovery Solicitation message to the VFC ports of the FCFs and to receive FIP Discovery Advertisement messages replied by the VFC ports of the FCFs via a VN port of the ENode, the FIP Discovery Solicitation message carrying a Virtual Network ID(VN ID) of the VN port of the ENode, the FIP Discovery Advertisement messages carrying VN IDs of the VFC ports;

wherein each ENode is further to compare the Virtual Network (VN ID) of the Virtual Node(VN) port of the ENode with the VN IDs carried in FIP Discovery Advertisement messages, and to log the VN port to a VFC port having another VN ID which matches the VN ID of the VN port of the ENode in preference to other VFC ports which do not match with the VN ID of the VN port of the ENode, wherein a virtual link is established between the VN port of the ENode and the VFC port; and wherein each FCF is to receive FIP Discovery Solicitation message sent by the VN ports of the ENodes and to reply an FIP Discovery Advertisement message to the VN ports of the ENodes via a VFC port of the FCF, the FIP Discovery Advertisement message carrying an additional VN ID of the VFC port of the FCF.

9. The system according to claim 8 wherein each ENode is further used for adding all of the FCFs that replied with the FIP Discovery Advertisement messages, to an accessible FCF list the ENode maintains, so that a login is to be initiated to another VFC port of another FCF in the accessible FCF list when a fault occurs in the FCF where the VFC port connected to the VN port of the ENode is located.

10. The system according to claim 9, wherein each ENode is further used for triggering a timer corresponding to the VN port of the ENode that represents a collection time when sending the FIP Discovery Solicitation message via the VN port of the ENode, and to start to perform the matching when timing of the timer expires.

11. The system according to claim 8, wherein each type of FIP messages, including the FIP Discovery Solicitation message and the FIP Discovery Advertisement message, carry a respective VN ID in a reserved field of a respective message header.

12. The system according to claim 11, wherein each ENode is further used for initiating a login to another VFC port whose VN ID value is a default value indicating that a reserved field does not carry anything when there is no matched VN ID.

13. The method of claim 1 further comprising allocating a first Virtual Network ID (VN ID) to a first sub-set of the ENodes and the FCFs which belong to a first virtual network and allocating a second VN ID to a second sub-set of the ENodes and the FCFs which belong to a second virtual network.

* * * * *